United States Patent
Xu et al.

(10) Patent No.: US 12,551,221 B2
(45) Date of Patent: Feb. 17, 2026

(54) BLOOD FLOW GUIDE DEVICE CONVEYING SYSTEM CAPABLE OF VISUAL TRACKING AND POSITIONING, AND TRACKING AND POSITIONING METHOD

(71) Applicant: Beijing Taijieweiye Technology Co., Ltd, Beijing (CN)

(72) Inventors: Yongsong Xu, Beijing (CN); Lei Mu, Beijing (CN); Hang Tang, Beijing (CN); Chuan Qin, Beijing (CN); Jian Wu, Beijing (CN); Jinlei Wang, Beijing (CN)

(73) Assignee: Beijing Taijieweiye Technology Co., Ltd, Beijing (CN)

( * ) Notice: Subject to any disclaimer, the term of this patent is extended or adjusted under 35 U.S.C. 154(b) by 338 days.

(21) Appl. No.: 18/042,672

(22) PCT Filed: Dec. 21, 2020

(86) PCT No.: PCT/CN2020/137899
§ 371 (c)(1),
(2) Date: Feb. 23, 2023

(87) PCT Pub. No.: WO2022/041593
PCT Pub. Date: Mar. 3, 2022

(65) Prior Publication Data
US 2023/0329729 A1    Oct. 19, 2023

(30) Foreign Application Priority Data
Aug. 24, 2020    (CN) .......................... 202010857374.0

(51) Int. Cl.
*A61B 17/22*    (2006.01)
*A61F 2/966*    (2013.01)
*A61M 25/09*    (2006.01)

(52) U.S. Cl.
CPC .............. *A61B 17/22* (2013.01); *A61F 2/966* (2013.01); *A61M 25/09041* (2013.01); *A61B 2017/22038* (2013.01)

(58) Field of Classification Search
CPC ........... A61B 17/22; A61B 2017/22038; A61F 2/966; A61F 2/90; A61F 2002/823;
(Continued)

(56) References Cited

U.S. PATENT DOCUMENTS

| 8,696,728 B2 | 4/2014 | Hebert et al. |
| 2002/0133222 A1 * | 9/2002 | Das .......................... A61F 2/915 623/1.42 |

(Continued)

FOREIGN PATENT DOCUMENTS

| CN | 101479006 A | 7/2009 |
| CN | 104398282 A | 3/2015 |

(Continued)

OTHER PUBLICATIONS

First Office Action for Chinese Application No. 202010857374.0, dated Dec. 29, 2020, 25 pages with English translation.
(Continued)

*Primary Examiner* — Richard G Louis
(74) *Attorney, Agent, or Firm* — TraskBritt (57) ABSTRACT

A blood flow guide device conveying system comprises a blood flow guide device, a push guide wire, a support spring, a distal spring, a friction gasket, a distal marker, a proximal marker, and a complete release marker. The distal spring is provided at a distal end of the push guide wire. The distal marker is provided at a proximal end of the distal spring and configured to indicate a start state or completion state. The blood flow guide device is pre-mounted between the distal marker and the complete release marker. The friction gasket is provided on a distal end of the complete release marker.
(Continued)

The proximal marker is provided on a distal end of the friction gasket. The friction gasket is used for stabilizing the blood flow guide device by pushing the push guide wire. The complete release marker is provided at a distal end of the support spring.

8 Claims, 4 Drawing Sheets

(58) Field of Classification Search
CPC ...... A61F 2/95; A61F 2/97; A61F 2250/0098; A61M 25/09041; A61M 25/0108; A61M 2025/0042; A61M 2025/09166
See application file for complete search history.

(56) References Cited

U.S. PATENT DOCUMENTS

| | | | | |
|---|---|---|---|---|
| 2003/0195609 | A1* | 10/2003 | Berenstein | A61F 2/88 623/1.15 |
| 2004/0230285 | A1* | 11/2004 | Gifford, III | A61F 2/97 623/1.11 |
| 2007/0299501 | A1* | 12/2007 | Hebert | A61F 2/95 623/1.11 |
| 2014/0172001 | A1 | 6/2014 | Becking et al. | |
| 2014/0257452 | A1* | 9/2014 | Slazas | A61F 2/966 623/1.11 |
| 2017/0035592 | A1 | 2/2017 | Haggstrom et al. | |
| 2017/0340330 | A1 | 11/2017 | Stoppenhagen | |
| 2018/0214675 | A1* | 8/2018 | Shekalim | A61M 25/09041 |

FOREIGN PATENT DOCUMENTS

| | | | |
|---|---|---|---|
| CN | 107028639 A | * | 8/2017 |
| CN | 107041769 A | | 8/2017 |
| CN | 107468390 A | | 12/2017 |
| CN | 207912722 | | 9/2018 |
| CN | 108742962 A | | 11/2018 |
| CN | 109044469 A | | 12/2018 |
| CN | 109195657 A | | 1/2019 |
| CN | 111195164 A | | 5/2020 |
| CN | 111888062 A | | 6/2021 |

OTHER PUBLICATIONS

Second Office Action for Chinese Application No. 202010857374.0, dated Mar. 22, 2021, 25 pages with English translation.
International Search Report for Application No. PCT/CN2020/137899 dated May 20, 2021, 3 pages.
International Written Opinion for Application No. PCT/CN2020/137899 dated May 20, 2021, 6 pages.

* cited by examiner

BLOOD FLOW GUIDE DEVICE CONVEYING SYSTEM CAPABLE OF VISUAL TRACKING AND POSITIONING, AND TRACKING AND POSITIONING METHOD

CROSS-REFERENCE TO RELATED APPLICATIONS

This application is a national phase entry under 35 U.S.C. § 371 of International Patent Application PCT/CN2020/137899, filed Dec. 21, 2020, designating the United States of America and published as International Patent Publication WO 2022/041593 A1 on Mar. 3, 2022, which claims the benefit under Article 8 of the Patent Cooperation Treaty to Chinese Patent Application Serial No. 202010857374.0, filed Aug. 24, 2020.

TECHNICAL FIELD

The disclosure relates to the field of special instrument technologies, in particular, to a blood flow guide device conveying system capable of visual tracking and positioning, and a tracking and positioning method.

BACKGROUND

In general, a blood flow guide device is a braided stent with high metal surface coverage. At present, there are many mature blood flow guide products in the market now, and the product structures of different companies are slightly different.

How to visually track and position the conveying process of a blood flow guide device has always been a technical challenge, especially the release and retrieval control of a retrievable blood flow guide device.

In view of this, this disclosure puts forward a new technical scheme.

BRIEF SUMMARY

The purpose of the disclosure is to provide a blood flow guide device conveying system capable of visual tracking and positioning, and a tracking and positioning method, which can visually and accurately control the release, retrieval or secondary release of a blood flow guide device in the whole process.

In a first aspect, an embodiment of the disclosure provides a blood flow guide device conveying system capable of visual tracking and positioning, including: a blood flow guide device, a push guide wire, a support spring, a distal spring, a friction gasket, a distal marker, a proximal marker and a complete release marker;
  the distal spring, the distal marker, the blood flow guide device, the proximal marker, the friction gasket, the complete release marker and the support spring are sequentially arranged on the push guide wire from a distal end to a proximal end, wherein the distal spring, the distal marker, the blood flow guide device, the proximal marker and the complete release marker are made of a radiographic material under contrast imaging;
  the distal spring is arranged at the distal end of the push guide wire;
  the distal marker is arranged at a proximal end of the distal spring, a gap of 1 mm to 5 mm is arranged between the proximal end of the distal spring and the distal marker to indicate a positioning of the blood flow guide device conveyed in a microcatheter cavity, wherein when the distal marker is aligned with a distal marker of the microcatheter cavity, it is indicated that the blood flow guide device starts to release;
  the blood flow guide device is prearranged between the distal marker and the complete release marker;
  the friction gasket is arranged on a distal end of the complete release marker, a gap of 1 mm to 5 mm is arranged between the friction gasket and the complete release marker, the proximal marker is arranged on a distal end of the friction gasket, and the friction gasket is used for stabilizing the conveying of the blood flow guide device pushed by the push guide wire in the microcatheter cavity; and
  the complete release marker is arranged at a distal end of the support spring, and when the complete release marker is aligned with the distal marker of the microcatheter cavity, it is indicated that the blood flow guide device stops releasing.

Preferably, when the proximal marker is aligned with the distal marker of the microcatheter cavity, it is indicated that the blood flow guide device is about to stop releasing.

Preferably, the friction gasket is made of ultraviolet curing glue.

Preferably, the push guide wire is tapered and is provided with a polytetrafluoroethylene (PTFE) coating at the proximal end, and a total length of the push guide wire is 190 cm to 230 cm, wherein a length of the coating at the proximal end of the push guide wire is 150 cm to 190 cm; and
  the friction gasket has a length of 5 mm to 20 mm, an outer diameter of 0.40 mm to 0.60 mm, a precision of 0.01 mm and a hardness of 30 D to 40 D, and a distance between the friction gasket and a tail end of the push guide wire is 5 cm to 25 cm.

Further, preferably, the distal end of the push guide wire has a minimum diameter of 0.08 mm to 0.20 mm, and the proximal end of the push guide wire has a maximum diameter of 0.36 mm to 0.50 mm.

Preferably, two ends of the support spring and the push guide wire are fixed together by ultraviolet UV curing glue or soldering;
  the distal spring is made of platinum-tungsten alloy or platinum-iridium alloy, and has a primary wire diameter of 0.04 mm to 0.07 mm and a length of 0.5 cm to 3 cm; and
  the distal spring and the push guide wire are assembled together by UV curing glue or soldering, and a tail end of the distal spring is provided with a distal spherical cap.

Preferably, the distal marker, the proximal marker and the complete release marker are made of platinum-tungsten alloy or platinum-iridium alloy, a distance between the distal marker and the complete release marker is 2 cm to 8 cm, the distal marker, the proximal marker and the complete release marker have diameters of 0.4 mm to 0.7 mm and widths of 0.5 mm to 2 mm.

In a second aspect, an embodiment of the disclosure provides a visual tracking and positioning method for the blood flow guide device in the blood flow guide device conveying system capable of visual tracking and positioning as described in the first aspect, and the visual tracking and positioning method includes:
  after pushing the blood flow guide device into a microcatheter cavity, pushing the push guide wire under contrast imaging, so that the distal marker of the blood flow guide device conveying system is aligned with a distal marker of the microcatheter cavity and the blood flow guide device reaches a position where release is started;

withdrawing a microcatheter so that the blood flow guide device is gradually released from the distal end to the proximal end, and tracking the positions of the proximal marker and the complete release marker relative to the distal marker of the microcatheter cavity in real time under contrast imaging, wherein in the release process, the blood flow guide device gradually changes from a compressed state to an open state; and completing the release of the blood flow guide device when the complete release marker is aligned with the distal marker of the microcatheter cavity.

Preferably, after completing the release of the blood flow guide device, the method further includes: withdrawing the push guide wire and the distal spring, the distal marker, the proximal marker, the friction gasket, the complete release marker and a support spring arranged on the push guide wire.

Preferably, in the process of withdrawing the microcatheter, before the proximal marker is aligned with the distal marker of the microcatheter cavity, the method further includes:

stopping withdrawing the microcatheter and pushing the microcatheter, so that the released blood flow guide device is gradually compressed from the proximal end to the distal end and retracted into the microcatheter cavity again; and when the distal marker of the blood flow guide device conveying system is aligned with the distal marker of the microcatheter cavity again, adjusting the position of the microcatheter and releasing the blood flow guide device again, or withdrawing the microcatheter together with the blood flow guide device conveying system in the microcatheter.

According to the blood flow guide device conveying system capable of visual tracking and positioning provided by the embodiment of the disclosure, the positioning of the blood flow guide device conveyed in the microcatheter cavity is indicated by the distal marker, the proximal marker and the complete release marker, the distal marker is used to indicate that the release starts to release, the complete release marker is used to indicate that the release stops releasing, and the proximal marker is used to indicate that the release is about to stop releasing and indicate a critical point for retrieving the blood flow guide device, so that the whole process is visible, tracking and positioning can be realized, and the control accuracy is greatly improved. In addition, the friction gasket made of ultraviolet curing glue has high precision, strong adhesion with the guide wire, and uniform and controllable hardness, thus improving the reliability of the release and retrieval of the blood flow guide device.

DETAILED DESCRIPTION

The technical solution of the invention will be described in further detail below with reference to the drawings and embodiments.

Figure 1:
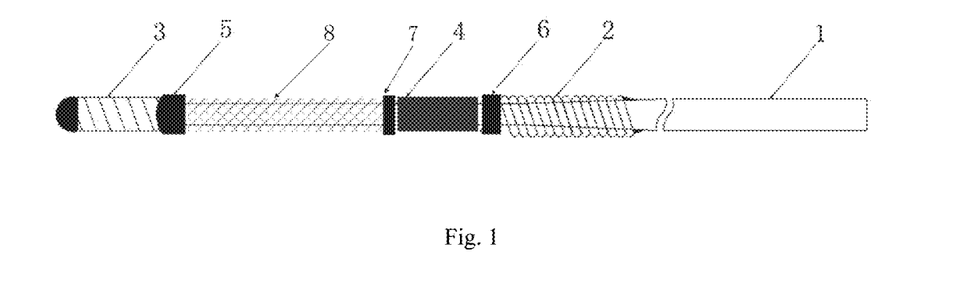
FIG. 1 is a structural diagram of a blood flow guide device capable of being visually tracked and positioned provided by an embodiment of the disclosure.

An embodiment of the disclosure provides a blood flow guide device capable of being visually tracked and positioned, which, as shown in FIG. 1, includes a blood flow guide device 8, a push guide wire 1, a support spring 2, a distal spring 3, a friction gasket 4, a distal marker 5, a proximal marker 7 and a complete release marker 6.

The positional relationships between different components are described by taking a side of the distal spring 3 in FIG. 1 as the distal end, and an operating end of the push guide wire 1 (i.e., the right side in FIG. 1) as the proximal end.

The distal spring 3, the distal marker 5, the blood flow guide device 8, the proximal marker 7, the friction gasket 4, the complete release marker 6 and the support spring 2 are sequentially arranged on the push guide wire 1 from the distal end to the proximal end, wherein the distal spring 3, the distal marker 5, the blood flow guide device 8, the proximal marker 7 and the complete release marker 6 are made of a radiographic material that make the structures of interest stand out visually under contrast imaging;

the distal spring 3 is arranged at the distal end of the push guide wire 1;

the distal marker 5 is arranged at a proximal end of the distal spring 3, a gap of 1 mm to 5 mm exists between the proximal end of the distal spring 3 and the distal marker 5 to clearly indicate the positioning of the blood flow guide device 8 conveyed in a microcatheter cavity, and when the distal marker 5 is aligned with a distal marker 5 of the microcatheter cavity, it is indicated that the release of the blood flow guide device 8 starts to release;

the blood flow guide device 8 is prearranged between the distal marker 5 and the complete release marker 6;

the friction gasket 4 is arranged on a distal end of the complete release marker 6, a gap of 1 mm to 5 mm exists between the friction gasket and the complete release marker 6, and the friction gasket 4 is used for stabilizing the conveying of the blood flow guide device 8 pushed by the push guide wire 1 in the microcatheter cavity;

the proximal marker 7 is arranged on a distal end of the friction gasket 4; when the proximal marker 7 is aligned with the distal marker 5 of the microcatheter cavity, it is indicated that the release of the blood flow guide device 8 is about to stop releasing, so that an accurate indication can be given when the release is about to end; in addition, the proximal marker 7 is also used to indicate a critical point of retrieving the blood flow guide device 8 in the release process; and the blood flow guide device 8 can be retrieved at any point before the proximal marker 7 is aligned with the distal marker 5 of the microcatheter cavity, so that the blood flow guide device can be released again after adjusting the position of the microcatheter in the case of inaccurate positioning. After the proximal marker 7 is aligned with the distal marker 5 of the microcatheter cavity, the blood flow guide device cannot be retrieved. Visual position observation can clearly indicate whether the blood flow guide device 8 is in a retrievable state, so as to prevent an operator from retrieving the blood flow guide device 8 at an unretrievable position, which may otherwise cause damage to the blood flow guide device or other problems.

The complete release marker 6 is arranged at a distal end of the support spring 2, and when the complete release marker 6 is aligned with the distal marker 5 of the microcatheter cavity, it is indicated that the release of the blood flow guide device 8 is completed.

In the specific implementation of this embodiment, the push guide wire 1 is tapered and is provided with a polytetrafluoroethylene (PTFE) coating at the proximal end, and a total length of the push guide wire is 190 cm to 230 cm, wherein a length of the coating at the proximal end of the push guide wire 1 is 150 cm to 190 cm; and the friction gasket 4 is made of ultraviolet curing glue with high fluidity and proper hardness, the friction gasket has a length of 5 mm to 20 mm, an outer diameter of 0.40 mm to 0.60 mm, a precision of 0.01 mm and a hardness of 30 D to 40 D, and a distance between the friction gasket 4 and a tail end, on a proximal side, of the push guide wire 1 is 5 cm to 25 cm.

The specific preparation process of the friction gasket 4 can be as follows: one or two notches are machined in one or both ends of a tearable polyolefin heat-shrinkable tube or FEP heat-shrinkable tube in advance to facilitate subsequent peeling; a high-precision stainless steel mandrel or PTFE mandrel is covered with the heat-shrinkable tube through thermal shrinkage first, then the mandrel is removed, and then the heat-shrinkable tube with a precise inner diameter (equal to the diameter of the mandrel) sleeves a distal part of the push guide wire 1 of the disclosure; after that, the heat-shrinkable tube is fully injected with ultraviolet curing glue, the distal end of the push guide wire 1 is kept at a center of the heat-shrinkable tube, ultraviolet light irradiation is conducted so that the glue can be completely cured within 5 S to 30 S (5-30 S), and then the heat-shrinkable tube is peeled off along the pre-machined notch in the end to obtain an integrally formed friction gasket 4. The friction gasket 4 has good adhesion and can be well fixed to the push guide wire 1, and the hardness of the friction gasket 4 is uniform and controllable.

Two ends of the support spring 2 and the push guide wire 1 are fixed together by ultraviolet UV curing glue or soldering. In this embodiment, the support spring 2 is a densely wound 304 stainless steel spring with a primary wire diameter of 0.04 mm to 0.08 mm and a length of 5 cm to 20 cm.

The distal spring 3 is made of platinum-tungsten alloy or platinum-iridium alloy, with a primary wire diameter of 0.04 mm to 0.07 mm and a length of 0.5 cm to 3 cm; and the distal spring 3 and the push guide wire 1 are assembled together by UV curing glue or soldering, and a tail end of the distal spring 3 is provided with a distal spherical cap made of a polymer material or a metal material. Further, in order to improve the softness of the distal spring 3, the distal spring is subjected to heat treatment for shape setting at 580° C. to 650° C. before being assembled with the push guide wire 1.

Specifically, the distal spring may be straight as shown in FIG. 1, or J-shaped or S-shaped.

The distal marker 5, the proximal marker 7 and the complete release marker 6 are made of platinum-tungsten alloy or platinum-iridium alloy, a distance between the distal marker 5 and the complete release marker 6 is 2 cm to 8 cm, diameters of the distal marker 5, the proximal marker 7 and the complete release marker 6 are 0.4 mm to 0.7 mm, and widths of the distal marker, the proximal marker and the complete release marker are 0.5 mm to 2 mm.

According to the blood flow guide device 8 capable of being visually tracked and positioned, the visual tracking and positioning of the blood flow guide device 8 in the whole conveying process can be realized, and the operation convenience of the release of the blood flow guide device 8 and the accuracy and precision of the release position can be effectively improved.

Figure 2:
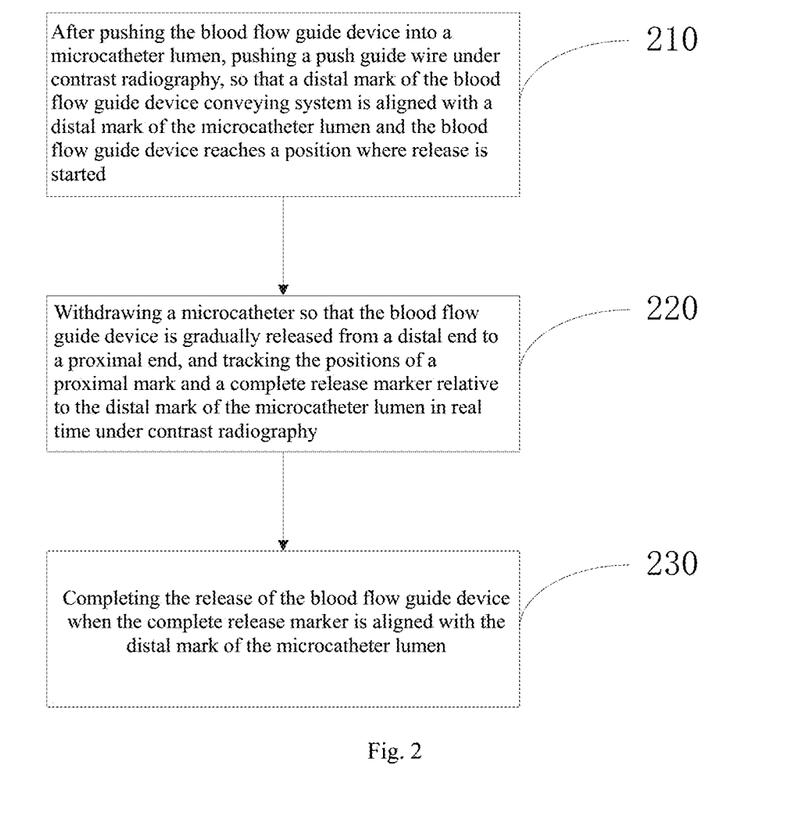
FIG. 2 is a flowchart of a visual tracking and positioning method provided by an embodiment of the disclosure.

FIG. 2 is a flowchart of a visual tracking and positioning method provided by an embodiment of the disclosure. FIG. 3 to FIG. 6 are diagrams of several states during the implementation of the method, and the method of the disclosure will be explained with reference to FIG. 2 to FIG. 6.

Figure 3:
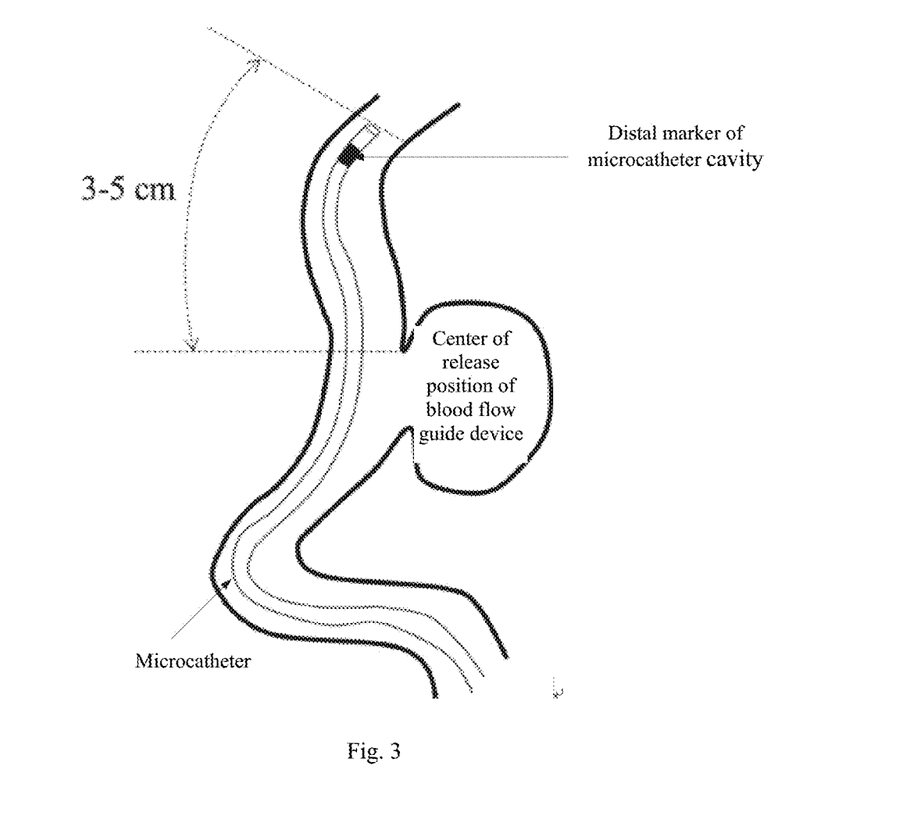
FIG. 3 is a first diagram of a visual tracking and positioning process provided by an embodiment of the disclosure.
Figure 4:
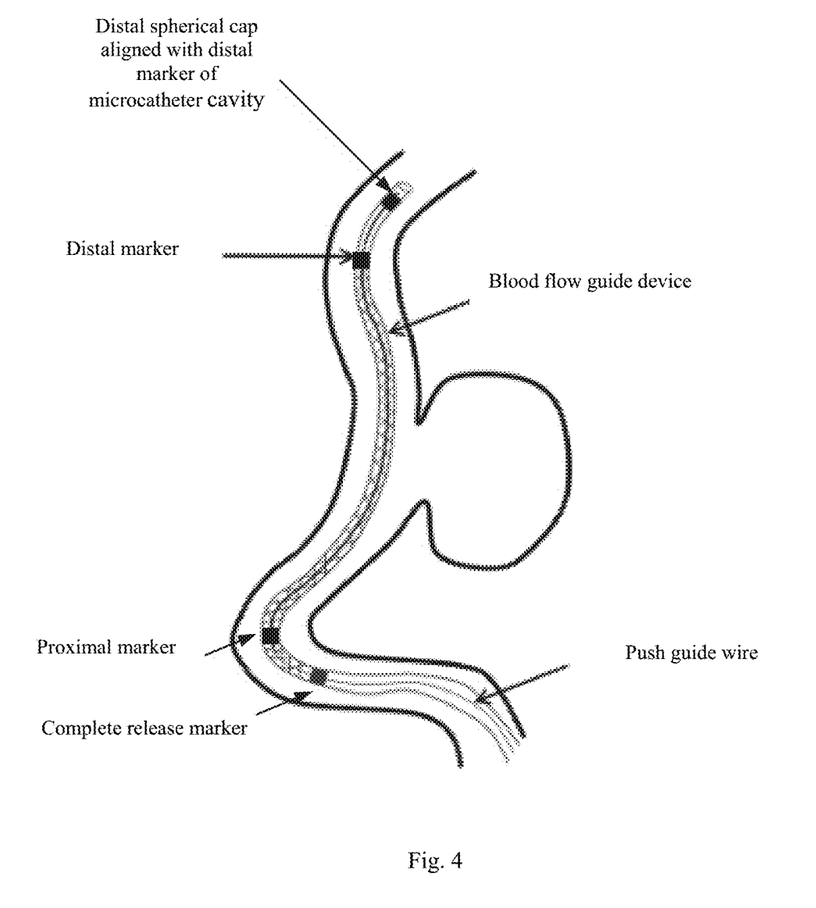
FIG. 4 is a second diagram of a visual tracking and positioning process provided by an embodiment of the disclosure.
Figure 5:
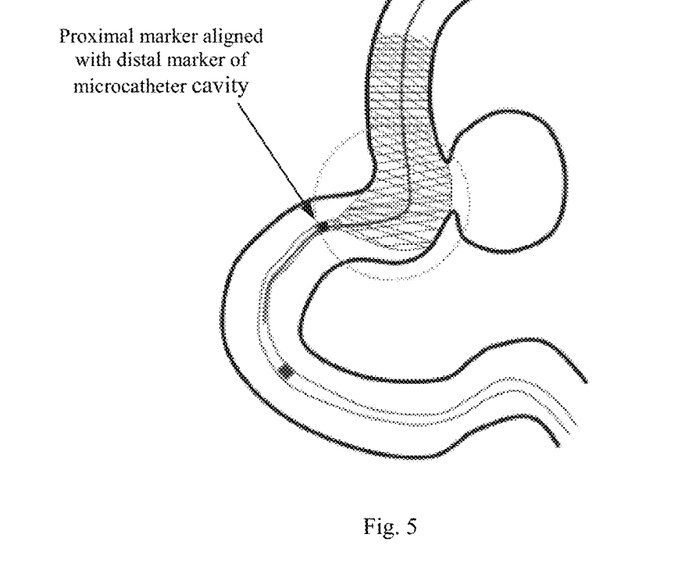
FIG. 5 is a third diagram of a visual tracking and positioning process provided by an embodiment of the disclosure.

The method mainly includes:

step 210, after pushing the blood flow guide device into a microcatheter cavity, pushing a push guide wire under contrast imaging, so that a distal marker of the blood flow guide device conveying system is aligned with a distal marker of the microcatheter cavity and the blood flow guide device reaches a position where release is started;

wherein before the blood flow guide device is pushed into the microcatheter cavity, the microcatheter should be sent to an appropriate position first, as shown in FIG. 3, this position is preferably 3 cm to 5 cm beyond a center of a release position of the blood flow guide device, and an end of the microcatheter cavity is provided with a distal marker of the microcatheter cavity visible under contrast imaging; and then the blood flow guide device is conveyed into the microcatheter cavity by the blood flow guide device conveying system, the state when a distal spherical cap of the blood flow guide device conveying system is aligned with the distal marker of the microcatheter cavity is shown in FIG. 4, and a friction gasket is not shown in FIG. 4;

step 220, withdrawing a microcatheter so that the blood flow guide device is gradually released from a distal end to a proximal end, and tracking the positions of a proximal marker and a complete release marker relative to the distal marker of the microcatheter cavity in real time under contrast imaging;

wherein in the release process, the blood flow guide device gradually changes from a compressed state to an open state, as shown in FIG. 5; and step 230, completing the release of the blood flow guide device when the complete release marker is aligned with the distal marker of the microcatheter cavity.

Figure 6:
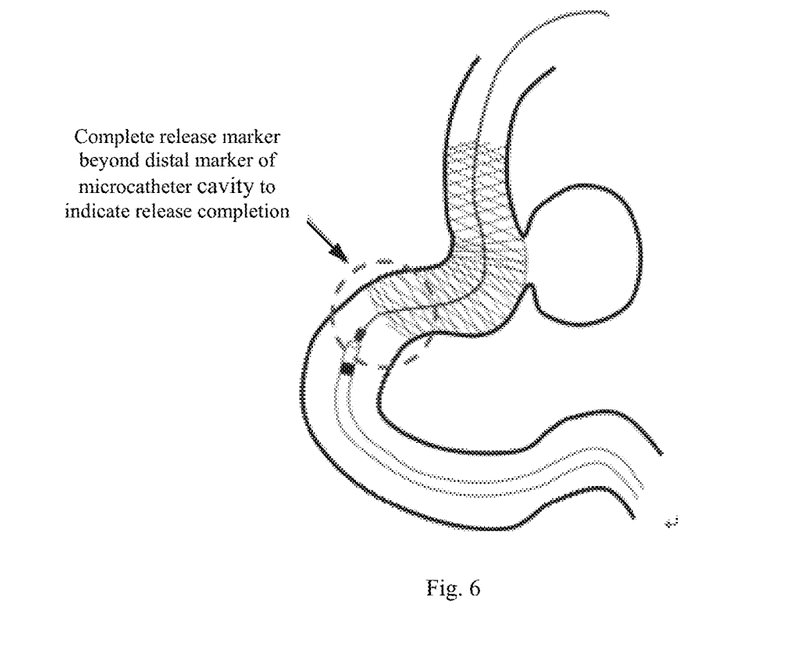
FIG. 6 is a fourth diagram of a visual tracking and positioning process provided by an embodiment of the disclosure.

After the release is completed, the blood flow guide device is fully opened. A state where the release has been completed is shown in FIG. 6.

After the release of the blood flow guide device is completed, the push guide wire and a distal spring, the distal marker, the proximal marker, a friction gasket, the complete release marker and a support spring arranged on the push guide wire are withdrawn, so that the whole release process of the blood flow guide device is completed.

Further, in the release process, if the release position needs to be adjusted or release needs to be stopped and the whole device needs to be withdrawn, the withdrawal of the microcatheter can be stopped before the proximal marker is aligned with the distal marker of the microcatheter cavity, and the microcatheter can be pushed, so that the released blood flow guide device is gradually compressed from the proximal end to the distal end and retrieved into the microcatheter cavity again; and when the distal marker of the blood flow guide device conveying system is aligned with the distal marker of the microcatheter cavity again, it is indicated that the blood flow guide device conveying system is completely retrieved into the microcatheter, at this point, the position of the microcatheter can be adjusted, and then the blood flow guide device can be released again, or the microcatheter together with the blood flow guide device conveying system in the microcatheter can be withdrawn.

According to the blood flow guide device conveying system capable of visual tracking and positioning provided by the embodiment of the disclosure, the positioning of the blood flow guide device conveyed in the microcatheter cavity is indicated by the distal marker, the proximal marker and the complete release marker, the distal marker is used to indicate that the release is started, the complete release marker is used to indicate that the release is completed, and the proximal marker is used to indicate that the release is about to be completed and indicate a critical point for retrieving the blood flow guide device, so that the whole process is visible, tracking and positioning can be realized, and the control accuracy is greatly improved. In addition, the friction gasket made of ultraviolet curing glue has high precision, strong adhesion with the guide wire, and uniform and controllable hardness, thus improving the reliability of the release and retrieval of the blood flow guide device.

Professionals should further realize that the units and algorithm steps of each example described in connection with the embodiments disclosed herein can be implemented in electronic hardware, computer software or a combination of the two. In order to clearly explain the interchangeability of hardware and software, the components and steps of each example have been generally described according to functions in the above description. Whether these functions are implemented in hardware or software depends on the specific application and design constraints of the technical scheme. Professionals can use different methods to implement the described functions for each specific application, but such implementation should not be considered beyond the scope of the disclosure.

The steps of a method or algorithm described in connection with the embodiments disclosed herein may be implemented in hardware, a software module executed by a processor, or a combination of the two. The software module can be placed in a random access memory (RAM), memory, read-only memory (ROM), electrically programmable ROM, electrically erasable programmable ROM, register, hard disk, removable magnetic disk, CD-ROM, or any other form of storage medium known in the technical field.

The above-mentioned specific embodiments further explain the purposes, technical schemes and beneficial effects of the invention in detail. It should be understood that the above are only specific embodiments of the disclosure and are not used to limit the scope of protection of the invention. Any modifications, equivalent substitutions, improvements, etc. made within the spirit and principles of the disclosure should be included in the scope of protection of the invention.

What is claimed is:

1. A visual tracking and positioning method for a blood flow guide device in the blood flow guide device conveying system capable of visual tracking and positioning, comprising:

after pushing the blood flow guide device into a microcatheter cavity, pushing the push guide wire under contrast imaging, so that the distal marker of the blood flow guide device conveying system is aligned with a distal marker of the microcatheter cavity and the blood flow guide device reaches a position where a release of the blood flow guide device is started;

withdrawing a microcatheter so that the blood flow guide device is gradually released from the distal end to the proximal end, and tracking the positions of the proximal marker and the complete release marker relative to the distal marker of the microcatheter cavity in real time under contrast imaging, wherein in the release process, the blood flow guide device gradually changes from a compressed state to an open state; and completing the release of the blood flow guide device when the complete release marker is aligned with the distal marker of the microcatheter cavity;

wherein the blood flow guide device conveying system capable of visual tracking and positioning comprising: the blood flow guide device, the push guide wire, a support spring, a distal spring, a friction gasket, the distal marker, the proximal marker and the complete release marker;

the distal spring, the distal marker, the blood flow guide device, the proximal marker, the friction gasket, the complete release marker and the support spring are sequentially arranged on the push guide wire from a distal end to a proximal end, wherein the distal spring, the distal marker, the blood flow guide device, the proximal marker and the complete release marker are made of a radiographic material under contrast imaging;

the distal spring is arranged at the distal end of the push guide wire;

the distal marker is arranged at a proximal end of the distal spring, a gap of 1 mm to 5 mm is arranged between the proximal end of the distal spring and the distal marker to indicate a positioning of the blood flow guide device conveyed in a microcatheter cavity, wherein the distal marker is configured to indicate that the blood flow guide device starts to release when the distal marker is aligned with a distal marker of the microcatheter cavity;

the blood flow guide device is prearranged between the distal marker and the complete release marker;

the friction gasket is arranged on a distal end of the complete release marker, a gap of 1 mm to 5 mm is arranged between the friction gasket and the complete release marker, the proximal marker is arranged on a distal end of the friction gasket, and the friction gasket is used for stabilizing the conveying of the blood flow guide device pushed by the push guide wire in the microcatheter cavity; and the complete release marker is arranged at a distal end of the support spring, and the complete release marker is configured to indicate that the blood flow guide device stops releasing when the complete release marker is aligned with the distal marker of the microcatheter cavity;

the proximal marker is configured to indicate that the blood flow guide device is about to stop releasing when the proximal marker is aligned with the distal marker of the microcatheter cavity.

2. The visual tracking and positioning method of claim 1, wherein after completing the release of the blood flow guide device, the method further comprises: withdrawing the push guide wire and the distal spring, the distal marker, the proximal marker, the friction gasket, the complete release marker and the support spring arranged on the push guide wire.

3. The visual tracking and positioning method of claim 1, wherein in the process of withdrawing the microcatheter, before the proximal marker is aligned with the distal marker of the microcatheter cavity, the method further comprises:
   stopping withdrawing the microcatheter and pushing the microcatheter, so that the released blood flow guide device is gradually compressed from the proximal end to the distal end and retracted into the microcatheter cavity again; and
   when the distal marker of the blood flow guide device conveying system is aligned with the distal marker of the microcatheter cavity again, adjusting the position of the microcatheter and releasing the blood flow guide device again, or withdrawing the microcatheter together with the blood flow guide device conveying system in the microcatheter.

4. The visual tracking and positioning method of claim 1, wherein the friction gasket comprises an ultraviolet curing glue.

5. The visual tracking and positioning method of claim 1, wherein the push guide wire is tapered and is provided with a polytetrafluoroethylene (PTFE) coating at the proximal end, and a total length of the push guide wire is 190 cm to 230 cm, wherein a length of the coating at the proximal end of the push guide wire is 150 cm to 190 cm; and
   the friction gasket has a length of 5 mm to 20 mm, an outer diameter of 0.40 mm to 0.60 mm, a precision of 0.01 mm and a hardness of 30 D to 40 D, and a distance between the friction gasket and a tail end of the push guide wire is 5 cm to 25 cm.

6. The visual tracking and positioning method of claim 1, wherein the distal end of the push guide wire has a minimum diameter of 0.08 mm to 0.20 m, and the proximal end of the push guide wire has a maximum diameter of 0.36 mm to 0.50 mm.

7. The visual tracking and positioning method of claim 1, wherein two ends of the support spring and the push guide wire are fixed together by ultraviolet UV curing glue or soldering;
   the distal spring comprises a platinum-tungsten alloy or a platinum-iridium alloy, and has a primary wire diameter of 0.04 mm to 0.07 mm and a length of 0.5 cm to 3 cm; and
   the distal spring and the push guide wire are assembled together by a UV curing glue or soldering, and a tail end of the distal spring is provided with a distal spherical cap.

8. The visual tracking and positioning method of claim 1, wherein the distal marker, the proximal marker and the complete release marker comprise a platinum-tungsten alloy or a platinum-iridium alloy, a distance between the distal marker and the complete release marker is 2 cm to 8 cm, the distal marker, the proximal marker and the complete release marker have diameters of 0.4 mm to 0.7 mm and widths of 0.5 mm to 2 mm.

* * * * *